United States Patent Office 3,409,713
Patented Nov. 5, 1968

3,409,713
PHENOTHIAZINYL AMINOCYCLOPROPANES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed May 8, 1964, Ser. No. 366,148
11 Claims. (Cl. 260—243)

This invention relates to novel phenothiazinyl aminocyclopropane derivatives having useful pharmacodynamic activity. More specifically, the compounds of this invention have antidepressant activity as measured by their ability to prevent reserpine-induced ptosis in rates. This pharmacological property is used to characterize antidepressant activity of such known useful agents as imipramine. In addition, unlike other cyclopropane-type antidepressants, the compounds of this invention do not inhibit monoamine oxidase activity in vivo as indicated by their relative failure to potentiate tryptamine-induced convulsions in rats.

The novel phenothiazinyl aminocyclopropanes of this invention may be represented by the following general structural formula:

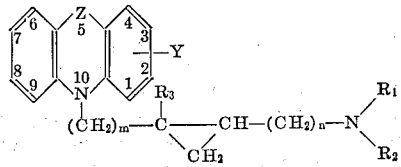

FORMULA I in which:

Z represents S, SO or $SO_2$, preferably S;
Y represents hydrogen, chlorine, trifluoromethyl, methyl methoxy or methylthio, preferably in the 1- or 2-position of the phenothiazine ring;
$m$ and $n$ each represent a positive integer from 0 to 1;
$R_1$ and $R_2$ each represent hydrogen, lower alkyl of from 1 to 3 carbon atoms or when taken together with the nitrogen atom to which they are attached, represent a pyrrolidine, piperidine, N'-methylpiperazine, N'-($\beta$-hydroxyethyl)-piperazine or N'-($\beta$-acetoxyethyl)-piperazine ring; and
$R_3$ represents hydrogen or methyl.

Preferred compounds of this invention are represented by the above Formula I when $m$ is 0 and $n$ is 1.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethanedisulfonic, sulfamic, succinic, cyclohexylsulfamic, fumaric, maleic, benzoic and the like. These salts are readily prepared by methods known to the art.

The compounds of this invention may be present as cis-trans isomers due to the geometrical arrangement of the phenothiazinyl substituent and the amino moiety with respect to the cyclopropane ring and further as $d, l$ optical isomers. Unless otherwise specified in the description and accompanying claims, it is intended to include all isomers, whether separated or mixtures thereof.

In general the novel phenothiazinyl aminocyclopropanes of this invention are prepared from phenothiazinyl cyclopropanecarboxylic acids. These useful starting materials having the formula:

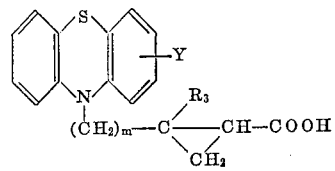

FORMULA II in which Y and $R_3$ are as defined in Formula I, and $m$ is 0 or 1, are prepared either by reaction of corresponding 10-vinylphenothiazines with ethyl diazoacetate ($m$ is 0) or direct alkylation of the 10 unsubstituted phenothiazine with for example, ethyl 2-bromo-, 2-bromo-2-methyl-, 2-bromomethyl-2-methyl- or 2-bromomethylcyclopropanecarboxylate. The 10-vinylphenothiazines are conveniently prepared via Hofmann degradation of corresponding 10-dimethylaminoethylphenothiazine methiodides.

The cyclopropanecarboxylic acids of Formula II above are converted to amino compounds of this invention by several routes. Reaction of the acid with a lower alkyl haloformate gives the corresponding cyclopropyl mixed anhydride which is then treated with sodium azide to give the cyclopropyl acid azide. The acid azide is then thermally decomposed by heating in an inert organic solvent to give the corresponding isocyanate. The resulting isocyanate is converted to aminocyclopropanes of Formula I where $n$ is 0 by (a) hydrolysis with a mineral acid such as hydrochloric acid or an alkali metal hydroxide such as sodium or potassium hydroxide at elevated temperatures or (b) reaction with a lower alkyl magnesium halide or lower alkanol to give an N-lower acyl or N-lower carbalkoxy aminocyclopropane, respectively, which is either reduced directly with for example lithium aluminum hydride to give an N-lower alkyl aminocyclopropane or further reacted with a lower alkyl iodide to give an N-lower alkyl-N-lower acyl or N-lower alkyl-N-lower carbalkoxy aminocyclopropane, respectively, which is reduced with for example lithium aluminum hydride to give an N,N-dialkyl-aminocyclopropane.

These reactions may be summarized as follows where

Y and R₃ are as defined in Formula I, $m$ is 0 or 1 and $R_1$ and $R_2$ are lower alkyl:

both $m$ and $n$ are 1 and $R_3$ is hydrogen, an alternative procedure for the preparation of the aminocyclopropyl

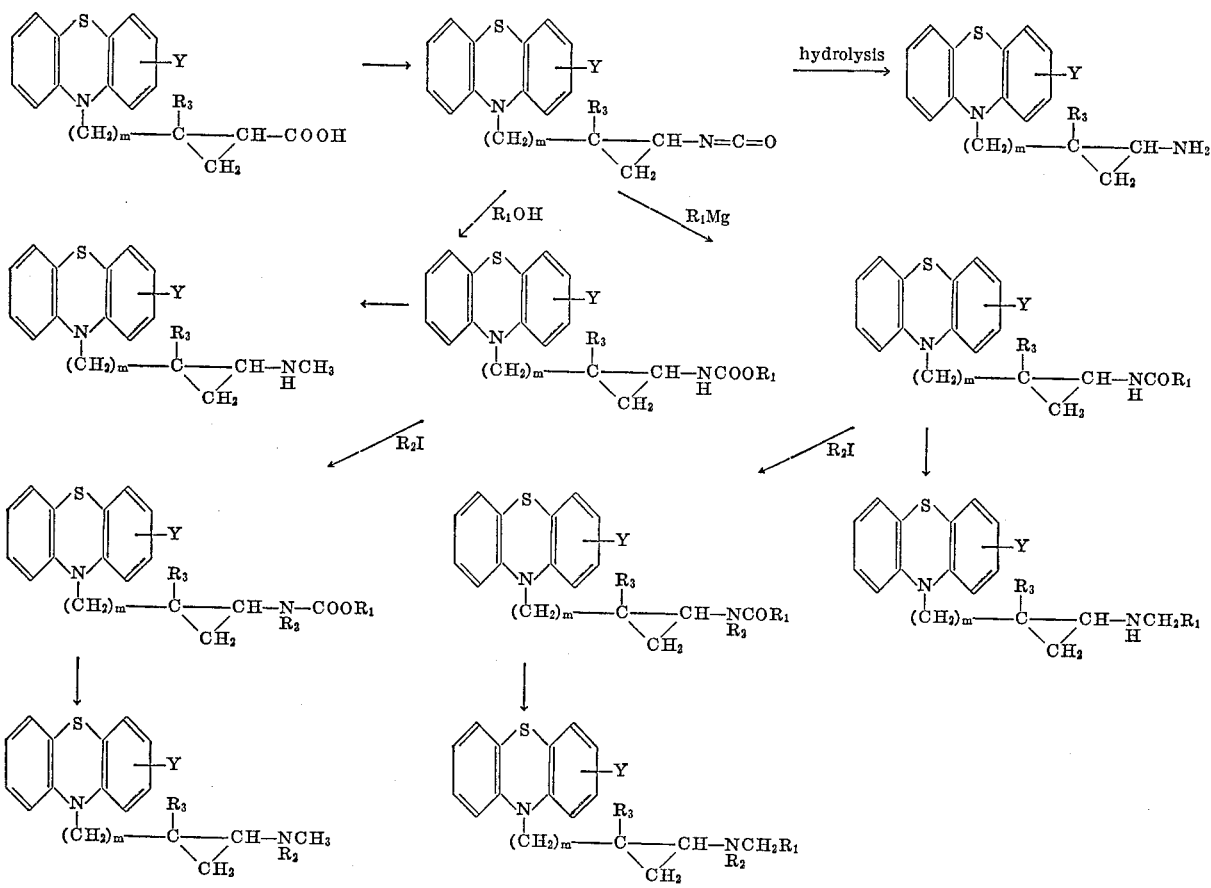

To prepare the aminocyclopropanes of Formula I where $n$ is 1 from the cyclopropanecarboxylic acids of Formula II, the acid is reacted with a lower alkyl haloformate to give the corresponding cyclopropyl mixed anhydride which is then treated with ammonia, a monoalkyl amine, a dialkylamine or a heterocyclic amine to give the cyclopropylcarboxamide. Reduction of the amide with for example lithium aluminum hydride gives the corresponding aminomethylcyclopropanes.

Alternatively, the novel phenothiazinyl aminocyclopropanes of this invention represented by Formula I above where $m$ is 1 are prepared by direct N-alkylation of 10-unsubstituted phenothiazines with an active ester derivative of aminocyclopropyl carbinols, for example a p-toluenesulfonate derivative. These useful carbinol intermediates having the formula:

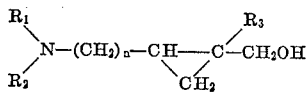

FORMULA III in which $R_1$ and $R_2$ are lower alkyl or when taken together with the nitrogen atom to which they are attached, represent a pyrrolidine, piperidine or N'-methylpiperazine ring, $R_3$ is hydrogen or methyl, and $n$ is 0 or 1, are prepared by reaction of for example ethyl 2-bromo-, 2-bromo-2-methyl-, 2-bromomethyl-2-methyl- or 2-bromomethylcyclopropanecarboxylate with an N-acyl-N-lower alkyl amine or the appropriate heterocyclic amine to give the corresponding aminocyclopropanecarboxylate which is reduced with for example lithium aluminum hydride to give the N,N-dialkylamino- or heterocyclic aminocyclopropyl carbinol.

In the preparation of compounds of Formula I where carbinols is by reaction of for example ethyl γ-bromocrotonate with an appropriate dialkylamine or heterocyclic amine to give the corresponding aminocrotonate which is then reacted with a reagent formed from trimethylsulfoxonium iodide. The latter in the presence of a strong base such as sodium hydride forms a reactive substance called dimethylsulfoxonium methylide,

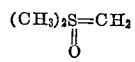

which produces the ethyl aminocyclopropylcarboxylate. Similar reduction of the carboxylate with for example lithium aluminum hydride gives the aminocyclopropyl carbinols of Formula III where $n$ is 1 and $R_3$ is hydrogen.

The aminocyclopropyl carbinols of Formula III above are advantageously employed in the phenothiazine alkylation as the tosylates. Thus reaction of the aminocyclopropyl carbinol tosylate with the appropriate 10-unsubstituted phenothiazine gives the desired product.

The compounds of Formula I above where $R_1$ and $R_2$ together represent a heterocyclic amino moiety are prepared also from the corresponding primary amines. The pyrrolidinyl and piperidinyl derivatives are prepared from the primary amine and 1,4-dibromobutane and 1,5-dibromopentane, respectively, in an organic solvent refluxing at a temperature from 100–150° C. and in the presence of potassium carbonate. Similar reaction of the primary amine with methyl bis-(β-chloroethyl)-amine gives the N'-methylpiperazinyl derivative.

The phenothiazinyl sulfoxide and sulfone derivatives of the compounds of the invention (Formula I above where Z is SO or SO₂) are readily prepared from the phenothiazinyl aminocyclopropanes by oxidation of preferably the oxalate salt with for example hydrogen peroxide. Mild oxidation, peroxide in ethanol, gives the sulfoxide whereas stronger conditions, peroxide in glacial acetic acid, furnishes the sulfone derivative.

The foregoing is a general description of the main synthetic routes in the preparation of the phenothiazinyl aminocyclopropanes of this invention. It will be readily apparent to one skilled in the art that variations of these procedures are possible. The following examples illustrate these procedures but should not be construed as limiting the invention to the specific compounds prepared thereby. Where the examples specify reaction of a trans compound, the corresponding cis isomer can of course be similarly employed.

Example 1

To a stirred mixture of 117 g. of 2-chlorophenothiazine in 500 ml. of dry toluene is added, under nitrogen, 21.5 g. of sodium amide. The mixture is stirred and refluxed for two hours, the heat is removed and a solution of dimethylaminoethyl chloride in toluene is added dropwise. The latter is prepared by dissolving 144 g. of dimethylaminoethyl chloride hydrochloride in a minimum volume of water, adding with cooling excess 40% sodium hydroxide solution, saturating mixture with sodium carbonate and extracting with toluene.

The reaction mixture is stirred and refluxed for two hours, cooled and then treated with 25 ml. of ethanol followed by 250 ml. of water, the latter added slowly. The separated organic layer is dried and concentrated in vacuo. The residue is distilled to give 2-chloro-10-(2-dimethylaminoethyl)-phenothiazine, B.P. 195–210° C. (0.8 mm.).

To a stirred solution of 127 g. of the above phenothiazine in 1.2 l. of acetone is added dropwise a solution of 71 g. of methyl iodide in 200 ml. of acetone. The reaction mixture is stirred at room temperature for one hour and then filtered to give 2-chloro-10-(2-dimethylaminoethyl)-phenothiazine methiodide, M.P. 230–231.5° C.

A suspension of anion exchange resin (hydroxide form) is washed several times with methanol, then suspended in 500 ml. of methanol and 75 g. of the above phenothiazine methiodide suspended in 150 ml. of methanol is added. The mixture is stirred at room temperature for one hour, filtered and the resin cake is washed with methanol. The filtrates are concentrated in vacuo and the residue (the corresponding phenothiazine methyl methoxide) is heated on a steam bath in vacuo until gas evolution is complete. The residue is taken up into ether and the solvent removed in vacuo to give 2-chloro-10-vinylphenothiazine, M.P. 78–80° C.

To a refluxing mixture of 2 g. of anhydrous cupric sulfate powder and 100 ml. of dry benzene is added, dropwise with stirring, a solution of 48.0 g. of the above 2-chloro-10-vinylphenothiazine and 27.4 g. of ethyl diazoacetate in 150 ml. of dry benzene. After addition is complete, the mixture is refluxed for 30 minutes, filtered and the filtrate concentrated in vacuo to give the residual ethyl 2-[10-(2-chlorophenothiazinyl)]-cyclopropanecarboxylate.

To a stirred solution of the above carboxylate in 200 ml. of ethanol is added a solution of 15.0 g. of potassium hydroxide in 50 ml. of water. The mixture is refluxed for two hours and then concentrated in vacuo. The residue is diluted with water and extracted with ether. The aqueous layer is acidified with acetic acid (pH 6) and extracted with ether. The ether extract is dried and concentrated in vacuo to give a residue which is suspended in 200 ml. of a hot, saturated solution of sodium bicarbonate. The filtered solid cyclopropanecarboxylic acid sodium salt is dissolved in 100 ml. of ethanol, then 200 ml. of water is added and the solution acidified to give trans-2-[10-(2-chlorophenothiazinyl)]-cyclopropanecarboxylic acid, M.P. 193–195° C. The aqueous filtrate from the filtration of the sodium salt is acidified to give a material which is extracted with ether. The dried extract is concentrated and the residue triturated with benzene to give cis-2-[10-(2-chlorophenothiazinyl)]-cyclopropanecarboxylic acid, M.P. 173–175° C.

To a solution of 6.35 g. of the above trans acid in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice/water and extracted with toluene. The dried extract is heated on the steam bath to decompose the acid azide. Removal of the solvent gives the residual trans-2-[10-(2-chlorophenothiazinyl)]-cyclopropyl isocyanate.

To a stirred mixture of 50 ml. of 3 M methyl magnesium bromide in ether is added 7.2 g. of the above isocyanate in ether. The mixture is refluxed for two hours, cooled and 200 ml. of 10% hydrochloric acid solution is added slowly. The separated aqueous layer is extracted with ether. Concentration of the organic solutions give the trans-2-[10-(2-chlorophenothiazinyl)]-N-acetylaminocyclopropane.

To a solution of 7.5 g. of the above N-acetylaminocyclopropane in 70 ml. of tetrahydrofuran is added 1.0 g. of 53.5% sodium hydride and the mixture is stirred and refluxed for one hour. A solution of 8 ml. of ethyl iodide in 25 ml. of tetrahydrofuran is added to the cooled reaction mixture which is then refluxed for four hours. An additional 8 ml. of ethyl iodide in 10 ml. of tetrahydrofuran is added and refluxing continued for 12 hours. The reaction mixture is filtered and the filtrate concentrated in vacuo. The residue is taken up in water and ether, extracted with ether and the dried solvent removed to give trans-2-[10-(2-chlorophenothiazinyl]-N-acetyl-N-ethyl aminocyclopropane.

A solution of the above N-acetyl-N-ethylaminocyclopropane (8.0 g.) in ether is added to a suspension of 5.0 g. of lithium aluminum hydride in ether and the mixture stirred and refluxed for six hours. Decomposition of the metal complex yields an oil which is treated in acetone solution with ethereal hydrogen chloride to give trans-2-[10-(2-chlorophenothiazinyl)]-N,N-diethylaminocyclopropane hydrochloride, M.P. 183–185° C.

Direct hydrolysis of the above trans-2-[10-(2-chlorophenothiazinyl)]-cyclopropyl isocyanate in concentrated hydrochloric acid at reflux for 12 hours yields upon workup trans-2-[10-(2-chlorophenothiazinyl)]-aminocyclopropane.

Example 2

To a solution of 6.7 g. of 2-trifluoromethylphenothiazine in 20 ml. of dimethylsulfoxide is added in portions 1.2 g. of a 53.5% suspension of sodium hydride in mineral oil, maintaining the temperature below 40° C. A solution of 4.8 g. of ethyl 2-bromocyclopropanecarboxylate in 10 ml. of dimethylsulfoxide is added dropwise and the mixture is heated on the steam bath for one hour. The reaction mixture is poured onto ice/water mixture and extracted with ether. The dried extract is concentrated to give ethyl 2-[10-(2-trifluoromethylphenothiazinyl)]-cyclopropanecarboxylate.

A mixture of 8.8 g. of the above cyclopropanecarboxylate in 100 ml. of ethanol and 2.6 g. of potassium hydroxide in water is stirred and refluxed for two hours. The alcohol is replaced by water using a trap and the filtered aqueous solution is extracted with ether. Acidification with concentrated hydrochloric acid solution gives a solid which is taken up in ethyl acetate. This solution is dried and evaporated to give an oil which is crystallized from ethyl acetate-petroleum ether to give trans-2-[10-(2-trifluoromethylphenothiazinyl)]-cyclopropanecarboxylic acid, M.P. 174–176° C.

To a mixture of 4.0 g. of the above trans acid and 3 ml. of triethylamine, cooled to 0° C., is added 2 ml. of ethyl chloroformate in acetone. The mixture is stirred for 15 minutes and then 4.4 g. of N-(β-hydroxyethyl) piperazine in acetone is added with cooling. After stirring for three hours at room temperature, the reaction mixture is poured into cold water and extracted with ether. The dried extract is evaporated to give trans-N-(β-hydroxyethyl) - N' - {2 - [10 - (2 - trifluoromethylphenothiazinyl)]-cyclopropanoyl}-piperazine, M.P. 113–115° C.

To a suspension of 1.0 g. of lithium aluminum hydride in ether is added a suspension of 4.0 g. of the above piperazine derivative in ether and the mixture stirred and refluxed for eight hours. After standing overnight at room temperature, the reaction mixture is decomposed, filtered and the filtrate acidified with ethanol-ethereal hydrogen chloride. Addition of excess ether precipitates the solid trans - 2 - [10 - (2 - trifluoromethylphenothiazinyl)]-N-[N' - (β - hydroxyethyl)]-piperazinylmethylcyclopropane hydrochloride, M.P. 250.5–252° C. (dec.). Acetylation with acetyl chloride yields the corresponding β-acetoxyethyl derivative.

Example 3

A solution of 10.0 g. of trans-2-[10-(2-trifluoromethylphenothiazinyl)]-cyclopropanecarboxylic acid (prepared as in Example 2) in acetone is treated with 7 ml. of triethylamine in acetone. The resulting mixture is cooled to 0° C. and 5 ml. of ethyl chloroformate in acetone is added. After stirring for 20 minutes, a solution of 7.1 g. of dimethylamine in acetone is added and stirring continued for 30 minutes with cooling and then for two hours at room temperature. The reaction mixture is poured into ice-water, extracted with methylene chloride and the dried extract evaporated. The residue is taken up in ether, extracted with 10% sodium hydroxide solution and the dried ether solution evaporated to give the solid trans-2-[10-(2-trifluoromethylphenothiazinyl)] - N,N - dimethylcyclopropanecarboxamide.

To 2.5 g. of lithium aluminum hydride in ether is added a solution of 10 g. of the above amide in ether and the mixture is stirred and refluxed for eight hours. After standing at room temperature overnight, the reaction mixture is decomposed, filtered and the filtrate evaporated. The residue is taken up in ethanol and treated with ethereal hydrogen chloride. Addition of excess ether precipitates the solid trans - 2 - [10-(2-trifluoromethylphenothiazinyl)]-N,N-dimethylaminomethylcyclopropane hydrochloride, M.P. 254–255° C.

Similarly, by employing 11 g. of pyrrolidine instead of dimethylamine in the above reaction sequence with subsequent reduction by 2.5 g. of lithium aluminum hydride there is obtained trans-2-[10-(2-trifluoromethylphenothiazinyl)]-N-pyrrolidinylmethylcyclopropane.

Example 4

A solution of 10 g. of trans-2-[10-(2-trifluoromethylphenothiazinyl)]-cyclopropanecarboxylic acid (prepared as in Example 2) in 25 ml. of acetone is treated with 7 ml. of triethylamine, cooled to —5° C. and 5 ml. of ethyl chloroformate in acetone is added. After stirring for 15 minutes, a solution of 4 g. of sodium azide in water is added and stirring continued for 30 minutes. The mixture is poured into ice-water, extracted with toluene and the dried etxract is heated on a steam bath, then refluxed for 30 minutes. Concentration in vacuo gives the isocyanate.

The above isocyanate in 100 ml. of ether is added to a solution of 45 ml. of 3 M methyl magnesium bromide in 50 ml. of ether with stirring and the mixture refluxed for two hours. The reaction mixture is poured cautiously onto 75 ml. of concentrated hydrochloric acid solution in ice. The ether layer is dried and concentrated to give trans - 2 - [10 - (2 - trifluoromethylphenothiazinyl)]-N-acetylaminocyclopropane.

A mixture of 12.2 g. of the above aminocyclopropane in 100 ml. of tetrahydrofuran and 1.4 g. of 53.5% sodium hydride is stirred and refluxed for one hour. To the cooled mixture is added 11.5 ml. of ethyl iodide in tetrahydrofuran. After refluxing for four hours, the reaction mixture is cooled and an additional 11.5 ml. of ethyl iodide in 25 ml. of tetrahydrofuran is added. Refluxing is continued for 18 hours and then the cooled reaction mixture is diluted with water, concentrated in vacuo and extracted with ether. The dried extract is evaporated to give trans-2-[10 - (2 - trifluoromethylphenothiazinyl)]-N-acetyl-N-ethylaminocyclopropane.

To a suspension of 4 g. of lithium aluminum hydride in ether is added a solution of 13.7 g. of the above N-acetyl-N-ethylaminocyclopropane in ether and the mixture stirred and refluxed for eight hours. Decomposition of the metal complex in the reaction mixture is followed by filtration and the filtrate is evaporated. The residue is taken up in acetone and treated with a solution of hexamic acid in acetone and treated with a solution of hexamic acid in acetone to yield trans-2-[10-(2-trifluoromethylphenothiazinyl)]-N,N - diethylaminocyclopropane cyclohexylsulfamate, M.P. 113–115° C.

Example 5

To a solution of 70 g. of 2-chlorophenothiazine in 200 ml. of dimethylsulfoxide is added 13 g. of 55.6% sodium hydride in portions, with cooling, and the mixture is stirred for 15 minutes. A solution of 57 g. of ethyl 2-bromocyclopropanecarboxylate in 190 ml. of dimethylsulfoxide is added and the mixture is stirred at room temperature for 45 minutes. After subsequent heating on the steam bath for 30 minutes, the reaction mixture is poured into 2 liters of ice-water, extracted with ether and the dried extract evoparated to give ethyl 2-[10-(2-chlorophenothiazinyl)]-cyclopropanecarboxylate.

A mixture of 84.5 g. of the above ethyl ester in 800 ml. of ethanol and 27 g. of potassium hydroxide in water is stirred and refluxed for one hour. After standing at room temperature overnight, the reaction mixture is concentrated in vacuo, diluted with 1 l. of water and extracted with ether. Acidification with concentrated hydrochloric acid solution gives a solid which is trans-2-[10-(2-chlorophenothiazinyl)]-cyclopropanecarboxylic acid, identical with that prepared by the method of Example 1.

Similarly, by employing ethyl 2-bromomethylcyclopropanecarboxylate in the above reaction sequence followed by hydrolysis yields trans-2-[10-(2-chlorophenothiazinyl)-methyl]-cyclopropanecarboxylic acid.

To a suspension of 25.6 g. of the above trans-2-[10-(2-chlorophenothiazinyl)]-cyclopropanecarboxylic acid in 200 ml. of acetone is added 19 ml. of triethylamine in acetone. The mixture is cooled to —5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans-2-[10-(2-chlorophenothiazinyl)]-N,N-dimethylcyclopropanecarboxamide.

A solution of 31.4 g. of the above amide in 225 ml. of ether is added to a suspension of 8 g. of lithium aluminum hydride in ether and the mixture refluxed for five and one-half hours. The reaction mixture is decomposed, filtered and the filtrate evaporated to give a solid which is dissolved in acetone. Ethereal hydrogen chloride is added to the acetone solution to yield trans-2-[10-(2-chlorophenothiazinyl)]-N,N-dimethylaminomethylcyclopropane hydrochloride, M.P. 237.5–238.5° C.

Similarly, by employing 33 g. of N-methylpiperazine instead of dimethylamine in the above reaction sequence, the corresponding trans-N-methyl-N'-{2-[10-(2-chlorophenothiazinyl)]-cyclopropanoyl}-piperazine is obtained which is reduced with 8 g. of lithium aluminum hydride to yield trans - 2-[10-(2-chlorophenothiazinyl)]-N'-methylpiperazinylmethylcyclopropane.

Example 6

To a suspension of 4.35 g. of sodium hydride in mineral oil and 100 ml. of dimethylsulfoxide, under nitrogen, is added a solution of 19.9 g. of phenothiazine in 150 ml. of dimethylsulfoxide, with cooling. The mixture is heated for 10 minutes in a warm water bath and then cooled as 19.3 g. of ethyl 2-bromocyclopropanecarboxylate in 50 ml. of dimethylsulfoxide is added. The mixture is heated on the steam bath for one hour, poured into 1 l. of ice-water, extracted with ether and the extract evaporated to give ethyl 2-(10-phenothiazinyl)-cyclopropanecarboxylate.

A mixture of 30.6 g. of the above ester in 250 ml. of ethanol and 11.2 g. of potassium hydroxide in water is stirred and refluxed for two hours. The solvent is removed in vacuo and the residue is taken up in 200 ml. of water, extracted with ether and the aqueous layer acidified to give a solid. This solid is taken up in warm benzene, dried, filtered and petroleum ether added to precipitate pure trans-2-(10-phenothiazinyl)-cyclopropanecarboxylic acid, M.P. 165.5–166.5° C.

A solution of 7.5 g. of the above acid in 75 ml. of acetone is treated with 7 ml. of triethylamine in acetone, cooled to —5° C. and 5 ml. of ethyl chloroformate in acetone is added. After stirring for 30 minutes in the cold, a solution of 11.5 g. of dimethylamine in 30 ml. of acetone is added and the mixture stirred for 30 minutes in the cold, one hour at room temperature and 15 minutes at 38–40° C. The reaction mixture is poured into ice-water, extracted with methylene chloride and the dried extract evaporated to give trans-2-(10-phenothiazinyl)-N,N-dimethylcyclopropanecarboxamide.

A solution of 10.2 g. of the above amide in ether is added to an ethereal suspension of 2.7 g. of lithium aluminium hydride and the mixture is refluxed for five hours, then decomposed. Removal of the solvent gives the solid trans - 2-(10-phenothiazinyl)-N,N-dimethylaminomethylcyclopropane; hydrochloride melts at 234–235° C.

Similarly by employing 21.3 g. of 2-methylphenothiazine in the above reaction sequence there is obtained as the final product trans-2-[10-(2-methylphenothiazinyl)]-N,N-dimethylaminomethylcyclopropane.

Example 7

To a suspension of 10.8 g. of trans-2-[10-(2-chlorophenothiazinyl)]-cyclopropanecarboxylic acid in 60 ml. of acetone is added 8 ml. of triethylamine in acetone, cooled to —5° C., 6 ml. of ethyl chloroformate in acetone is added and the mixture is stirred for 15 minutes in the cold. A solution of 4.4 g. of sodium azide in water is added, stirred for 30 minutes, poured into ice-water and extracted with toluene. The dried extract is heated unless gas evolution ceases and then the solvent is removed to give the trans-2-[10-(2-chlorophenothiazinyl)]-cyclopropyl isocyanate. The isocyanate (12.4 g.) is dissolved in 60 ml. of ethanol and stirred and refluxed for two hours. Removal of the solvent in vacuo gives the ethyl carbamate derivative, M.P. 169–172° C.

A solution of 11.8 g. of the above carbamate in 50 ml. of dimethylsulfoxide is added to a suspension of 1.4 g. of 55.6% sodium hydride (mineral oil) in 35 ml. of dimethylsulfoxide. The mixture is heated briefly, cooled to 20° C. and 7 ml. of methyl iodide is added, maintaining the temperature between 15–20° C. This mixture is heated at 55–60° C. for 30 minutes, poured into 250 ml. of ice-water, extracted with ether and the dried extract evaporated to give trans-2-[10-(2-chlorophenothiazinyl)]-N-methyl-N-carbethoxyaminocyclopropane.

To a suspension of 2.5 g. of lithium aluminum hydride in ether is added a solution of 12 g. of the above N-methyl carbamate in ether and the mixture is refluxed for four hours. The reaction mixture is decomposed, filtered, and the ether removed to give trans-2-[10-(2-chlorophenothiazinyl)]-N,N-dimethylaminocyclopropane; hydrochloride, M.P. 214–216° C.

Direct reduction of the above isocyanate with lithium aluminum hydride gives trans-2-[10-(2-chlorophenothiazinyl)]-N-monomethylaminocyclopropane.

Example 8

To a suspension of 2.4 g. of 53.5% sodium hydride in 300 ml. of dimethylsulfoxide is added a solution of 11.7 g. of 1-chlorophenothiazine in 50 ml. of dimethylsulfoxide. The mixture is stirred for 30 minutes at 90° C., cooled and 9.7 g. of ethyl 2-bromocyclopropanecarboxylate in 10 ml. of dimethylsulfoxide is added. After stirring for one hour at 90–95° C., the reaction mixture is poured into ice-water, extracted with ether and the dried ether extract evaporated to give ethyl-2-[10-(1-chlorophenothiazinyl)]-cyclopropanecarboxylate.

A mixture of 10.2 g. of the above ester in 100 ml. of ethanol and a solution of 5.6 g. of potassium hydroxide in water is stirred and refluxed for two hours. The solvent is removed in vacuo and the residue is taken up in 175 ml. of water, extracted with ether and the aqueous solution is acidified to give the solid trans-2-[10-(1- chlorophenothiazinyl)] - cyclopropanecarboxylic acid, M.P. 179.5–181.5° C.

To a suspension of 25.6 g. of the above acid in 200 ml. of acetone is added 19 ml. of triethylamine in acetone. The mixture is cooled to —5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans-2-[10-(1-chlorophenothiazinyl)] N,N-dimethylcyclopropanecarboxamide.

A solution of 31.4 g. of the above amide in 225 ml. of ether is added to a suspension of 8 g. of lithium aluminum hydried in ether and the mixture refluxed for six hours. The reaction mixture is decomposed, filtered and the filtrate evaporated to give trans-2-[10-(1-chlorophenothiazinyl)]-N,N-dimethylaminomethylcyclopropane; hydrochloride, M.P. 227.5–229° C.

Similarly by employing 11.5 g. of 1-methoxyphenothiazine in the above reaction sequence there is obtained as a final product trans-2-[10-(1-methoxyphenothiazinyl)]N,N-dimethylaminomethylcyclopropane.

Example 9

To a stirred solution of 49.6 g. of piperidine in 170 ml. of dry benzene is added dropwise during 10 minutes, 56.1 g. of ethyl 4-bromocrotonate. The mixture is stirred and refluxed for one hour, cooled and filtered. After washing the filter cake with ether, the combined organic filtrates are washed with water, dried and concentrated to give ethyl 4-(N-piperidinyl)-crotonate, B.P. 95–99° C./0.4 mm.

To a stirred suspension of 102.5 g. of trimethylsulfoxonium iodide in 500 ml. of dimethylsulfoxide is added in portions, maintaining the temperature below 35° C., 13.0 g. of sodium hydride (53.5% suspension in mineral oil). After hydrogen evolution is completed, 31.6 g. of ethyl 4-(N-piperidinyl)-crotonate is added dropwise at 25° C. The mixture is stirred at 25° C. for one hour, at 60° C. for two hours, then poured into 2 l. of ice-water and extracted with ether. The ether solution is extracted with 5% hydrochloric acid solution and the acid extract made alkaline with sodium hydroxide solution. This mixture is extracted with ether, the extract dried and concentrated in vacuo to give ethyl trans-2-(N-piperidinylmethyl)-cyclopropanecarboxylate, B.P. 112–114.5° C./3.5 mm.

A solution of 21.1 g. of the above carboxylate in 100 ml. of ether is added dropwise to a stirred suspension of 3.8 g. of lithium aluminum hydride in 300 ml. of dry ether and the mixture is refluxed for 30 minutes. Then is added successively, 4 ml. of water, 4 ml. of 10% aqueous sodium hydroxide and 12 ml. of water. The mixture is filtered and the filter cake is washed thoroughly with methylene chloride. The combined organic filtrates are dried and concentrated to give 2-hydroxymethyl-1-(N-piperidinylmethyl)-cyclopropane.

To a suspension of 4.5 g. of sodium hydride (53.5% suspension in mineral oil) in 100 ml. of dry tetrahydrofuran is added dropwise 16.9 g. of the above cyclopropane in 30 ml. of tetrahydrofuran. The mixture is stirred at 25° C. until hydrogen evolution is completed and then a solution of 19 g. of p-toluenesulfonyl chloride in 30 ml. of tetrahydrofuran is added dropwise, maintaining the temperature at 25° C. The reaction mixture is filtered to give a solution of 2-hydroxymethyl-1-(N-piperidinylmethyl)-cyclopropane, p-toluenesulfonate in tetrahydrofuran which may be used directly in the following alkylation step or isolated as a p-toluenesulfonate salt by treatment of the tetrahydrofuran solution with p-toluenesulfonic acid, concentration and recrystallization of the residue.

A solution of 19.9 g. of phenothiazine in 100 ml. of dimethylsulfoxide is added slowly to a suspension of 4.5 g. of sodium hydride (53.5% dispersion in mineral oil) in 100 ml. of dimethylsulfoxide at 20–25° C. After hydrogen evolution is completed, a solution of 32.3 g. of 2-hydroxymethyl-1-(N-piperidinylmethyl)-cyclopropane, p-toluenesulfonate in 160 ml. of tetrahydrofuran is added dropwise. The mixture is stirred and refluxed for one hour, poured into 1 l. of ice-water and extracted with ether. The extract is washed with water, dried and concentrated to give trans-2-(10-phenothiazinylmethyl)-1-(N-piperidinylmethyl)-cyclopropane.

Example 10

To a suspension of 4 g. of lithium aluminum hydride in ether is added a solution of 12 g. of trans-2-[10-(2-trifluoromethylphenothiazinyl)]-N-acetylaminocyclopropane (prepared as described in Example 4) in ether and the mixture stirred and refluxed for eight hours. The reaction mixture is decomposed, filtered and the filtrate evaporated to give trans-2-[10-(2-trifluoromethylphenothiazinyl)]-N-monoethylaminocyclopropane.

Example 11

To a solution of 6.35 g. of cis-2-[10-(2-chlorophenothiazinyl)]-cyclopropanecarboxylic acid (prepared as in Example 1) in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives cis-2-[10-(2-chlorophenothiazinyl)]-cyclopropyl isocyanate.

The isocyanate is suspended in a large volume of 20% aqueous hydrochloric acid and the mixture is refluxed and stirred for four hours. The resulting solution is made basic and extracted with ether. Evaporation of the ether extract gives cis-2-[10-(2-chlorophenothiazinyl)]-aminocyclopropane.

Example 12

To a suspension of 2.2 g. of sodium hydride in mineral oil and 50 ml. of dimethylsulfoxide, under nitrogen, is added a solution of 3.0 g. of N-formyl-N-methylamine in 50 ml. of dimethylsulfoxide, with cooling. The mixture is heated briefly on the water bath and then cooled as 9.7 g. of ethyl 2-bromocyclopropanecarboxylate in 25 ml. of dimethylsulfoxide is added. The mixture is heated on the steam bath for one hour, poured into ice-water, extracted with ether and the dried extract evaporated to give ethyl 2-(N-formyl-N-methylamino)-cyclopropanecarboxylate, B.P. 137–140° C./10 mm.

A solution of 17.1 g. of the above carboxylate in 100 ml. of ether is added dropwise to a stirred suspension of 7.6 g. of lithium aluminum hydride in 500 ml. of dry ether and the mixture is refluxed for four hours. The mixture is then decomposed, filtered and the dried filtrate concentrated to give 2-hydroxymethyl-1-(N,N-dimethylamino)-cyclopropane.

To a suspension of 4.5 g. of sodium hydride (53.5% suspension in mineral oil) in 100 ml. of dry tetrahydrofuran is added dropwise 11.5 g. of the above cyclopropane in 50 ml. of tetrahydrofuran. The mixture is stirred at 25° C. until hydrogen evolution is completed and then a solution of 19 g. of p-toluenesulfonyl chloride in 30 ml. of tetrahydrofuran is added dropwise, maintaining the temperature at 25° C. The reaction mixture is filtered to give a solution of 2-hydroxymethyl-1-(N,N-dimethylamino)-cyclopropane, p-toluenesulfonate which is used directly in the following alkylation step.

A solution of 23.3 g. of 2-chlorophenothiazine in 125 ml. of dimethylsulfoxide is added slowly to a suspension of 4.5 g. of sodium hydride (53.5% dispersion in mineral oil) in 100 ml. of dimethylsulfoxide at 20–25° C. After hydrogen evolution is completed, the above solution of the p-toluenesulfonate is added dropwise. The mixture is stirred and refluxed for one hour, poured into 1 l. of ice-water, dried and concentrated to give trans-2-[10-(2-chlorophenothiazinyl)-methyl]-N,N-dimethylaminocyclopropane.

Similarly alkylation of 24.5 g. of 2-methylthiophenothiazine as described above yields upon workup trans-2-[10-(2-methylthiophenothiazinyl)-methyl]-N,N-dimethylaminocyclopropane.

Example 13

To a solution of 35 g. of 2-chlorophenothiazine in 100 ml. of dimethylsulfoxide is added 6.5 g. of 55.6% sodium hydride in portions, with cooling, and the mixture is stirred for 15 minutes. A solution of 30 g. of ethyl 2-bromo-2-methyl-cyclopropanecarboxylate in 100 ml. of dimethylsulfoxide is added and the mixture is stirred at room temperature for 45 minutes. After heating on the steam bath for 30 minutes, the reaction mixture is poured into 1 l. of ice-water, extracted with ether and the dried extract evaporated to give ethyl 2-[10-(2-chlorophenothiazinyl)]-2-methylcyclopropanecarboxylate.

A mixture of 44 g. of the above ethyl ester in 400 ml. of ethanol and 13.5 g. of potassium hydroxide in water is stirred and refluxed for one hour. After standing at room temperature overnight, the reaction mixture is concentrated in vacuo, diluted with 500 ml. of water and extracted with ether. Acidification with concentrated hydrochloric acid solution gives trans-2-[10-(2-chlorophenothiazinyl)]-2-methylcyclopropanecarboxylic acid.

To a suspension of 15 g. of the above acid in 100 ml. of acetone is added 10 ml. of triethylamine in acetone. The mixture is cooled to −5° C., 7 ml. of ethylchloroformate in acetone is added and stirred for 30 minutes. A solution of 8 g. of dimethylamine in 40 ml. of acetone is added over 40 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans-2-[10-(2-chlorophenothiazinyl)]-2,N,N-trimethylcyclopropanecarboxamide.

A solution of 17 g. of the above amide in 150 ml. of ether is added to a suspension of 4 g. of lithium aluminum hydride in ether and the mixture refluxed for five and one-half hours. The reaction mixture is decomposed, filtered and the filtrate evaporated to give trans-2-[10-(2-chlorophenothiazinyl)]-2,N,N-trimethylaminomethylcyclopropane.

Example 14

To a solution of 15.2 g. of trans-2-[10-(2-chlorophenothiazinyl)]-N,N-dimethylaminomethylcyclopropane (prepared as in Example 5) in 125 ml. of acetone is added 6.3 g. of oxalic acid in acetone. Crystalline oxalate (17.4 g.), M.P. 206–209° C. dec., is collected. To a suspension of 8.7 g. of oxalate in 80 ml. of ethanol is added 20.8 ml. of a solution of hydrogen peroxide in ethanol (prepared by adding 10 ml. of 30% hydrogen peroxide to sufficient ethanol to make 100 ml.). The mixture is refluxed and stirred for 24 hours, concentrated and dissolved in water. The aqueous solution is made alkaline with sodium hydroxide and the mixture extracted with ether. The ether solution is dried and concentrated to give trans-2-[10-(2-chloro - 5 - oxyphenothiazinyl)] - N,N - dimethylaminomethylcyclopropane; hydrochloride, M.P. 268.5–270° C.

Example 15

To a solution of 7.9 g. of trans-2-[10-(2-chlorophenothiazinyl)] - N,N - dimethylaminomethylcyclopropane oxalate (prepared as in Example 14) in 100 ml. glacial acetic acid is added 14 ml. of 30% hydrogen peroxide. The solution is refluxed for five hours, concentrated in vacuo and made alkaline with sodium hydroxide. The mixture is extracted with ether and the ether extracts are dried and concentrated to give trans-2-[10-(2-chloro-5,5 - dioxyphenothiazinyl)] - N,N-dimethylaminomethylcyclopropane; hydrochloride, M.P. 294–296° C. dec.

What is claimed is:

1. A chemical compound selected from the group consisting of a free base and a salt thereof with a pharmaceutically acceptable acid, said free base having the formula:

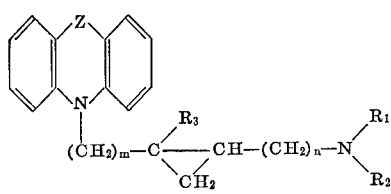

in which:
Z is a member selected from the group consisting of S, SO and $SO_2$;
Y is a member selected from the group consisting of hydrogen, chlorine, trifluoromethyl, methyl, methoxy and methylthio;
$m$ and $n$ each represent a positive integer of from 0 to 1;
$R_1$ and $R_2$ are members selected from the group consisting of, when taken individually, hydrogen and lower alkyl of from 1 to 3 carbon atoms, and when taken together with the nitrogen atom to which they are attached, a pyrrolidine, piperidine, N'-methylpiperazine, N'-($\beta$-hydroxyethyl)-piperazine and N'-($\beta$ - acetoxyethyl)-piperazine ring; and
$R_3$ is a member selected from the group consisting of hydrogen and methyl.

2. A chemical compound of the formula:

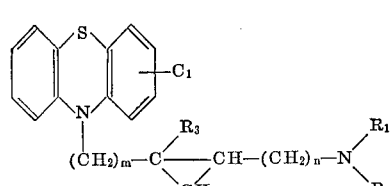

in which:
$m$ and $n$ each represent a positive integer of from 0 to 1;
$R_1$ and $R_2$ are lower alkyl of from 1 to 3 carbon atoms; and
$R_3$ is a member selected from the group consisting of hydrogen and methyl.

3. A chemical compound of the formula:

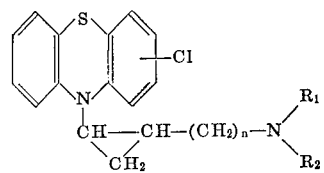

in which:
$n$ is a positive integer of from 0 to 1; and
$R_1$ and $R_2$ are lower alkyl of from 1 to 3 carbon atoms.

4. A chemical compound of the formula:

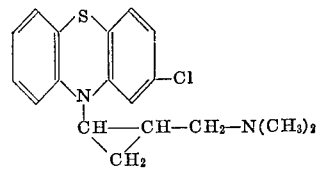

5. A chemical compound of the formula:

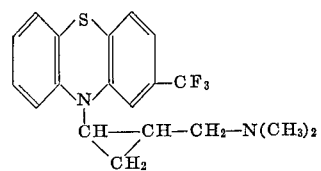

6. A chemical compound of the formula:

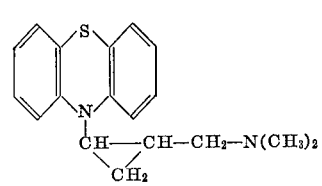

7. Trans - 2[10 - (2-chlorophenothiazinyl)]-N,N-dimethylaminomethylcyclopropane.

8. A chemical compound of the formula:

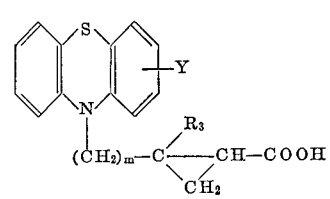

in which:
Y is a member selected from the group consisting of hydrogen, chlorine, trifluoromethyl, methyl, methoxy and methylthio;
$m$ is a positive integer of from 0 to 1; and
$R_3$ is a member selected from the group consisting of hydrogen and methyl.

9. A chemical compound of the formula:

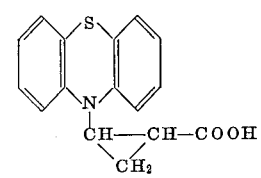

10. A chemical compound of the formula:

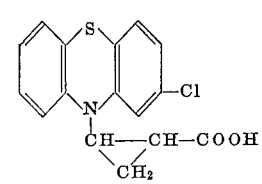

11. A chemical compound of the formula:
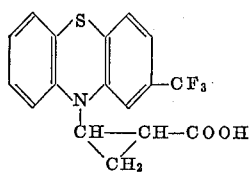
References Cited
UNITED STATES PATENTS
2,590,125 3/1952 Robinson et al. _____ 260—243
2,629,719 2/1953 Cusic _____ 260—243
FOREIGN PATENTS
355,782 1960 Japan.
HENRY R. JILES, *Primary Examiner.*
H. I. MOATZ, *Assistant Examiner.*

UNITED STATES PATENT OFFICE
CERTIFICATE OF CORRECTION

Patent No. 3,409,713                 November 5, 1968

Carl Kaiser et al.

It is certified that error appears in the above identified patent and that said Letters Patent are hereby corrected as shown below:

Column 13, lines 30 to 39, the formula should appear as shown below:

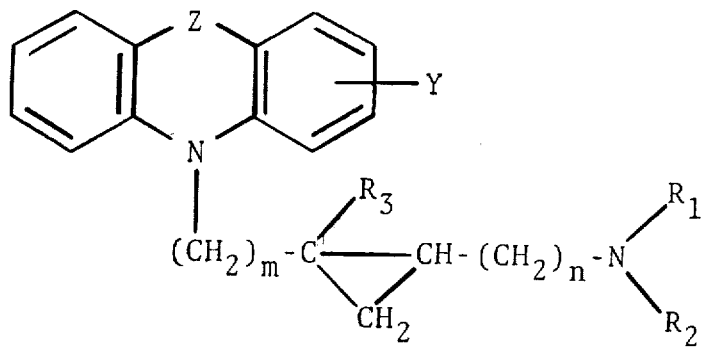

same column 13, lines 60 to 69, the formula should appear as shown below:

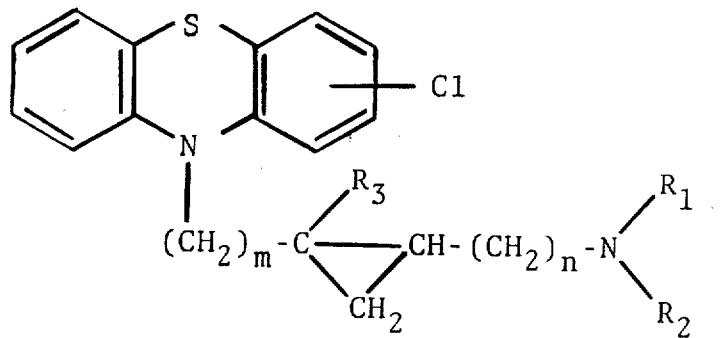

Signed and sealed this 10th day of March 1970.

(SEAL)
Attest:

EDWARD M. FLETCHER, JR.
Attesting Officer

WILLIAM E. SCHUYLER, JR.
Commissioner of Patents